US009823629B2

(12) United States Patent
Kuprijanov et al.

(10) Patent No.: US 9,823,629 B2
(45) Date of Patent: Nov. 21, 2017

(54) DUAL LOOP CONTROL SYSTEM WITH INTERACTIVE AUTOMATIC TRACKING MODE

(75) Inventors: Artur Kuprijanov, Visaginas (LT); Andreas Lübbert, Hemmingen (DE); Bernd-Markus Pfeiffer, Wörth (DE); Sebastian Schaepe, Halle (DE); Rimvydas Simutis, Kaunas (LT)

(73) Assignee: Siemens Aktiengesellschaft, Munich (DE)

( * ) Notice: Subject to any disclaimer, the term of this patent is extended or adjusted under 35 U.S.C. 154(b) by 613 days.

(21) Appl. No.: 13/883,744

(22) PCT Filed: Nov. 16, 2010

(86) PCT No.: PCT/EP2010/067597
§ 371 (c)(1),
(2), (4) Date: Oct. 16, 2013

(87) PCT Pub. No.: WO2012/065631
PCT Pub. Date: May 24, 2012

(65) Prior Publication Data
US 2014/0094937 A1  Apr. 3, 2014

(51) Int. Cl.
*G05B 15/02* (2006.01)
*G05B 11/32* (2006.01)

(52) U.S. Cl.
CPC .............. *G05B 15/02* (2013.01); *G05B 11/32* (2013.01)

(58) Field of Classification Search
CPC ...................................... G05B 15/02
(Continued)

(56) References Cited

U.S. PATENT DOCUMENTS 4,059,745 A   11/1977  Gaertner
4,281,970 A *  8/1981  Stewart ............... F02C 6/10
                                              417/22

(Continued)

FOREIGN PATENT DOCUMENTS

CN  1514961   7/2004
CN  1847818  10/2006
(Continued)

OTHER PUBLICATIONS

"Simatic Process Control System PCS 7, PCS 7 Advanced Process Library V71", Mar. 2009, A5E02102721-01, Siemens AG.

*Primary Examiner* — Christopher E Everett
(74) *Attorney, Agent, or Firm* — Cozen O'Connor

(57) ABSTRACT

A control device for a process, in which a controlled variable can be influenced with the aid of a plurality of different regulating units, which in particular are based on different physical principles. A set point and the controlled variable are fed to both a first controller and a second controller. The first controller is located as primary controller in automatic operation and has a regulating range of the first manipulated variable that is defined by limiting values. The second controller can be switched between automatic operation and tracking operation, in which the controller generates a predefined or predefinable constant value of the second manipulated variable. By means of a logic circuit, the second controller is switched to automatic operation if a limiting value of the first manipulated variable is reached, and otherwise to tracking operation. Advantageously, by means of the control device, a plurality of regulating units which have the same direction of action can be operated fully automatically and autonomously.

9 Claims, 2 Drawing Sheets

(58) Field of Classification Search
USPC .......................................................... 700/19
See application file for complete search history.

(56) References Cited

U.S. PATENT DOCUMENTS

| | | | | |
|---|---|---|---|---|
| 4,769,056 | A * | 9/1988 | Hofferber | B01D 3/4216 |
| | | | | 203/2 |
| 6,774,690 | B2 * | 8/2004 | Baker | G11C 7/1051 |
| | | | | 327/156 |
| 6,783,080 | B2 * | 8/2004 | Antoniou | G05D 23/1917 |
| | | | | 236/12.12 |
| 6,925,985 | B2 | 8/2005 | Wagner et al. | |
| 8,667,703 | B2 * | 3/2014 | McMahon | F26B 21/10 |
| | | | | 156/311 |
| 2004/0149259 | A1 | 8/2004 | Wagner et al. | |
| 2006/0264242 | A1 | 11/2006 | Dent | |

FOREIGN PATENT DOCUMENTS

| | | | | |
|---|---|---|---|---|
| CN | 101176367 | | 5/2008 | |
| CN | 100535513 C | * | 9/2009 | |
| CN | 201546938 U | * | 8/2010 | |
| DE | 2046990 | | 3/1972 | |
| GB | EP 0057541 A1 | * | 8/1982 | ............. G05B 19/39 |
| WO | WO 03/067342 | | 8/2003 | |

* cited by examiner

DUAL LOOP CONTROL SYSTEM WITH INTERACTIVE AUTOMATIC TRACKING MODE

CROSS-REFERENCE TO RELATED APPLICATIONS

This is a U.S. national stage of application No. PCT/EP2010/067597 filed 16 Nov. 2010.

BACKGROUND OF THE INVENTION

1. Field of the Invention

The invention relates to a control device for a process, in which a controlled variable can be influenced with the aid of a plurality of different control elements.

2. Description of the Related Art

In process or method engineering systems, it often occurs that there are two control elements for influencing a controlled variable that complement each another in their effect. Any manipulated variable that is fed to one of the two control elements does not by itself, i.e., without support from the respective other manipulated variable, have enough influence on the process to keep the controlled variable at the set point in all operating states. The two manipulated variables can also be differentiated with respect to the speed with which they affect the process and with respect to the costs and undesired side effects that may be associated with a control action. Normally, both manipulated variables are to be active simultaneously.

An example of this is the regulation of the oxygen partial pressure in a bioreactor, which is frequently referred to as a fermenter. The oxygen partial pressure as a controlled variable, which corresponds to the oxygen content of the broth found in the fermenter, can be influenced both by injecting air or oxygen with the aid of a first control element and by changing the rotational speed of the stirrer by a second control element. The stirrer is to rotate continuously and fresh air is to be supplied on a sustained basis. However, in order to avoid harming the living cells in the reactor, the stirring must not be too vigorous and too much air must not be injected.

One possible approach for regulating such a process would be partial automation in which a conventional Proportional-Integral-Derivative (PID) controller generates a first manipulated variable for one of the two control elements and a second manipulated variable is specified in manual mode. If it is no longer possible to achieve the control objective using the current specified value, an alarm notifies a system operator, who can change the second manipulated variable through manual intervention if required. Within the scope of recipe controls, such interventions in certain phases of batch production can be automated if their necessity in the recipe process can be predicted.

A "split-range control" for solving a somewhat different problem is known from the function manual "SIMATIC Prozessleitsystem PCS 7, PCS 7 Advanced Process Library V71" March 2009, A5E02102721-01 from Siemens AG. With the aid of a "split-range block" behind the controller output, a PID controller is able to distribute its control value to a plurality of different control elements, which act on the same controlled variable using different physical principles and in different directions. A typical example is the temperature control in a reactor that is heated by a live steam valve and cooled by a cooling water valve. Depending on the sign of the control difference, the controller can request heat energy or cooling energy, i.e., is able to work having a bidirectional output, although it is only possible to operate each individual control element in unipolar mode, i.e., in one direction of action. Thus, in the known split-range control, either the one or the other control element is active, but both are not active simultaneously, because they act in different directions. In this example, it makes no sense to heat and cool simultaneously.

SUMMARY OF THE INVENTION

It is therefore an object of the invention to provide a control device for a process, in which a controlled variable can be influenced with the aid of a plurality of different control elements, which makes it easily possible to operate two control elements that have the same direction of action and are able to be active simultaneously.

This and other objects and advantages are achieved in accordance with the invention by a control device, a control method, and a corresponding computer program or a computer program product, wherein, the fundamental control device is provided with separate controllers for the two control elements, i.e., separate PID controllers, which both receive the same controlled variable and both have the same direction of action, as do also control elements. Both controllers are permanently connected to their respective control elements. By specifying suitable manipulated variable limitations, it is ensured that both control elements are not completely switched off. Depending on the application, i.e., depending on the type of process and the control elements that are used, a decision is made as to which manipulated variable is to be the primary variable and thus which controller is to be the primary controller. As long as the control range of the primary controller, which is determined via the specified manipulated variable limitations, is able to reach a set point that is, for example, specified by an operator, the second controller, which can also be designated as the secondary controller, remains in tracking mode having a constant manipulated variable. As soon as the primary controller reaches one of its control range limits, the secondary controller is also activated, i.e., the secondary controller is taken from tracking mode into automatic mode.

Compared to the conventional control device described initially, which is only partially automated, or in comparison to recipe controls, the control device in accordance with the invention has the advantage of being able to work fully automatically and autonomously with control elements that have the same direction of action. Once the controllers used in the control device have been configured correctly, it does not require any additional attention from the operator during its operation, and no further special measures must be taken, for example, in a multiple-product system. By using a plurality of controllers that act on a common controlled variable, it is possible to use different individual control elements together to achieve a specified control objective more quickly than was previously the case. Different controllers may be involved that are configured independently. As a result, it is possible to adapt each controller to the behavior of the associated control element with respect to its dynamics. The two control elements typically work using different physical operating principles that also affect the process at different rates of speed. As a result, different parameter sets are also typically required for the controllers. Commissioning the controllers, in which the respective ideal parameters for the controllers are determined, can be performed in an especially simple manner by respectively activating only one of the plurality of controllers, whereas the others are respectively connected manually, so that the other controllers output a constantly specified value of the manipulated variable. In this way, it is possible to employ known methods for performing the computer-aided commissioning of controllers, for example, the PID tuner, which is integrated into the engineering system of the known SIMATIC PCS 7 process control system.

An additional advantage consists in the fact that only one common set point, which is the same for all controllers, must be specified for the controllers, which substantially facilitates the operation of the controllers in the system.

In an advantageous further embodiment of the invention, it is possible to change the limit values for the manipulated variable limitation of the respective primary controller as a function of the respective process state or as a function of time. It is thus possible to react to special situations when operating the system, for example, if the operation of the control elements is associated with variable resource consumption and, for example, energy costs are variable as a function of time.

By connecting the manipulated variable output back to the specified value for tracking in tracking mode, in which the manipulated variable of the secondary controller is routed to its input for the specified value, it is advantageously achieved that the secondary controller assumes the previously valid control value when switching from automatic mode to tracking mode and remains constant afterwards. This brings about a smooth switchover of the secondary controller.

In an additional advantageous embodiment of the invention, the secondary controller is constructed such that an operator is able to switch it in manual mode, in which the control value can be specified by the operator. Giving manual mode priority over tracking makes it possible to specify a desired, constant control value for the respective secondary controller that remains until the secondary controller is switched over from this operating mode into automatic mode. A logic circuit is also advantageous, which makes it possible to select which of the controllers is currently to work as the primary controller in a flexible manner and to change it even while the control device is operating.

It is also an object of the invention to provide a method for controlling a process that can be implemented using the control device and which is preferably implemented in software or a combination of software and hardware, so that the invention also relates to a computer program having program code instructions that are executable by a computer for implementing the method. In this context, the invention also relates to a computer program product, i.e., a data carrier or a storage medium, having such a computer program that is executable by a computer. Such a computer program is preferably a component of an automation device through which the control device is implemented, or is kept available in a memory of the automation device or can be loaded into this memory, so that when operating the automation device, this device automatically executes the method for controlling the process.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention as well as arrangements and advantages are described in detail below by means of the drawings, in which.

DETAILED DESCRIPTION OF THE PREFERRED EMBODIMENTS

Figure 1:
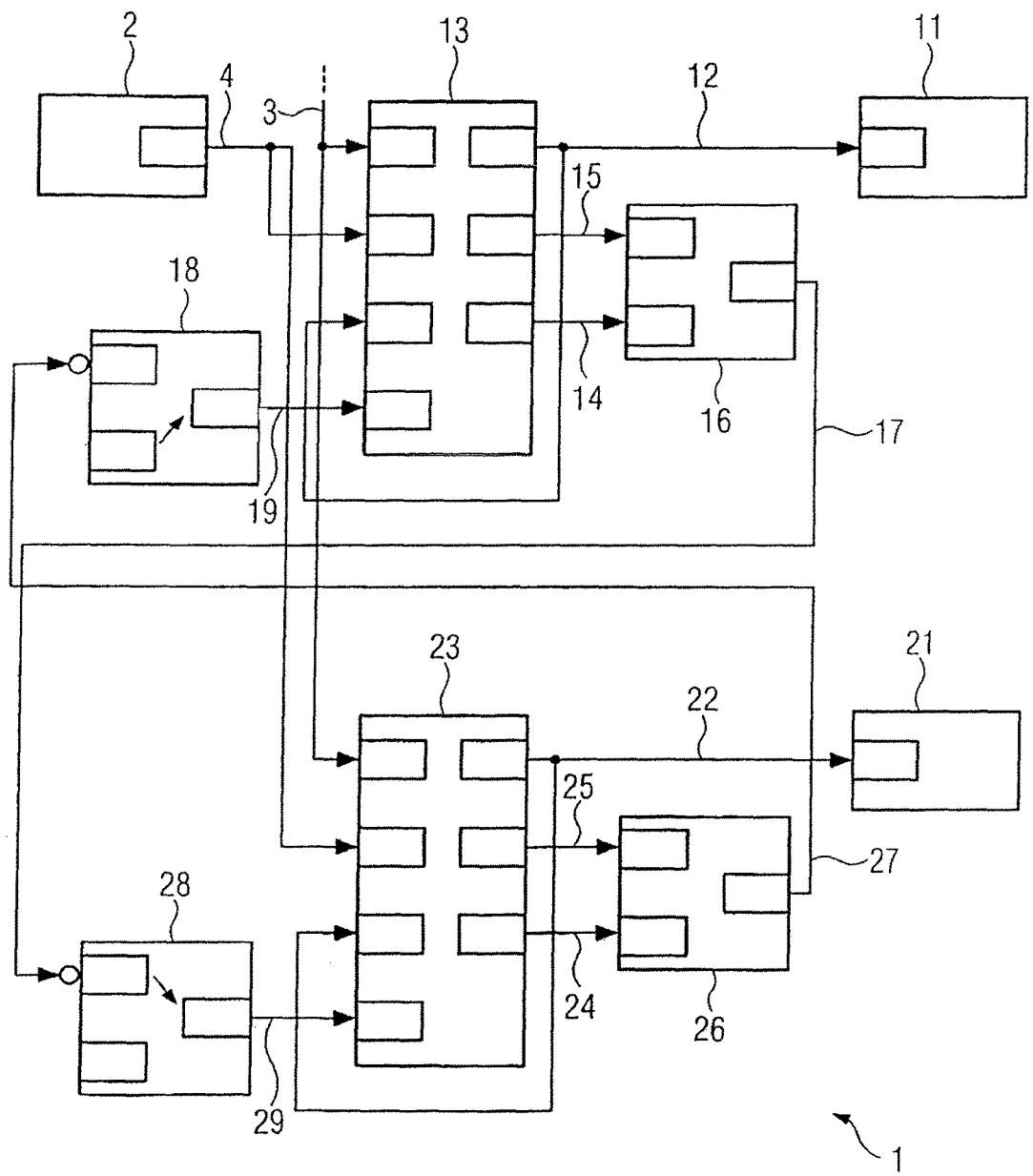
FIG. 1 is a schematic block diagram of the control device in accordance with the invention.
Figure 2:
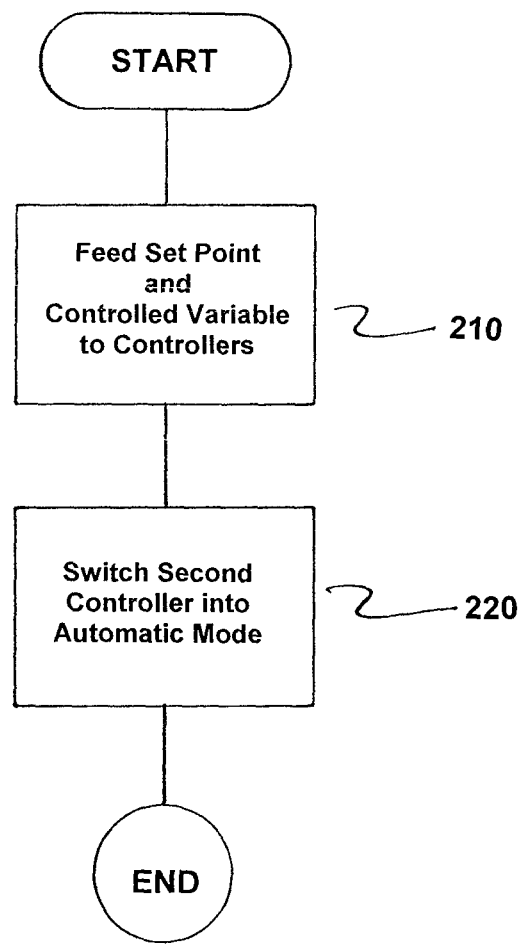
FIG. 2 is a flowchart of the method in accordance with the invention.

FIG. 1 shows a block diagram having various functional blocks out of which a control device 1 can be constructed. A measuring element 2, for example, a sensor for measuring the oxygen partial pressure, and a first control element 11, for example, a valve for setting the quantity of an air injection, and a second control element 21, for example, a stirrer having an upstream rotational speed control, serve to integrate the control device 1 into a control loop, which is not further depicted, with a process, for example, a bioreactor. A first PID controller 13 is arranged upstream from the first control element 11 for generating a first manipulated variable 12, and a second PID controller 23 is arranged upstream from the second control element 21 for generating a second manipulated variable 22. A set point 3 for the controlled variable 4 that is measured with the aid of the measuring element 2 is specified for the two controllers 13 and 23 via operator input, which is also fed to both controllers 13 and 23. The two controllers 13 and 23 calculate a control difference by means of the set point 3 and the controlled variable 4, which is required internally for determining the first manipulated variable 12 or the second manipulated variable 22 according to the control algorithm that is respectively configured in the first controller 13 or in the second controller 23, in the event that the respective controller works in automatic mode.

In a manipulated variable limitation device which is not illustrated, different limit values are stored in the first controller 13 and in the second controller 23 for the lower limits and the upper limits of their control ranges. If the first manipulated variable 12 of the first controller 13 reaches the lower limit value of the first manipulated variable 12, it is indicated via a high state of an indicator signal 14 of a logic circuit having a first OR gate 16. An indicator signal 15 serves to indicate that an upper limit value has been reached. The second controller 23 is also connected in a corresponding manner to a second OR gate 26, to which indicator signals 24 and 25 are routed for indicating that a lower limit value or an upper limit value of the control range of the second controller 23 has been reached. The logical output signal 17 of the first OR gate 16 is routed to a first input of a first selector 28 via a logical negation that is symbolized by a circle. In the illustrated switching state of the selector 28, the negated logical signal 17 is connected through to the selector output and routed as an activation signal 29 to an input for activating the tracking mode of the second controller 23 in the high state. In a corresponding manner, if the position of a second selector 18 deviates from the illustrated state, a second logical output signal 27 is used for generating an activation signal 19 for a tracking mode of the first controller 13. In the illustrated switching state of the selector 18, the selector supplies an activation signal 19 having a low state at its output, so that the controller 13 works as a primary controller in automatic mode.

In addition to its connection to the first control element 11, the first manipulated variable 12 is routed to an input of the first controller 13 for a specified value, which is output in tracking mode as a first manipulated variable 12. The same applies to the second manipulated variable 22 that is generated by the second controller 23.

In the selector position that is respectively symbolized by an arrow in the selectors 18 and 28, the first controller 13 is the primary controller, which works continuously in automatic mode. The second controller 23 is, for example, in tracking mode and outputs a constant value for the second manipulated variable 22. If the manipulated variable 12 of the first controller 13 reaches its upper or lower limit, this is indicated by a high state of the indicator signal 15 or the indicator signal 14, and the first OR gate 16 connects a low state to the activation signal 29 via the second selector 28, so that the tracking mode of the second controller 23 is deactivated, and it is thus switched into automatic mode to support the first controller 13. If the first controller 13 again leaves the boundary of the control range, the second controller 23 re-enters tracking mode such that the last-output value of the second manipulated variable 22 is held constant.

The limit values for the respective control ranges that are stored in the manipulated variable limitation devices of the first controller 13 and the second controller 23 can be static or can alternatively be variable, so that they can be modified as a function of the progression of the process or, for example, as determined by economic considerations.

The manual operating mode has priority over the tracking operating mode at the first controller 13 and at the second controller 23, so that in manual mode, a specification for the constant value of the respective manipulated variable can be made for the respective secondary controller.

By connecting the first manipulated variable 12 or the second manipulated variable 22 back to the tracking input of the first controller 13 or the second controller 23, the respective controller remembers the last-output value of the manipulated variable 12 or 22 and holds it constant as long as tracking mode is activated.

The two selectors 18 and 28 are always adjusted in opposite directions. If the second controller 23 is to be the primary controller, the selectors 18 and 28 are both adjusted deviating from the illustrated state, so that only the activation input for tracking operation of the first controller 13 is addressed, whereas the corresponding activation input of the second controller 23 is not. The symmetrically constructed logic circuit consisting of the two OR gates 16, 26 and the two selectors 18, 28 makes it possible to modify the decision during live operation as to which of the two controllers 13 or 23 is to be the current primary controller.

While there have been shown, described, and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A control device for a process wherein a controlled variable is influenceable by a plurality of different control elements which are based on different physical principles, comprising:
    a first Proportional-Integral-Derivative (PID) controller arranged upstream from a first control element, said first (PID) controller generating a first manipulated variable; and
    a second PID controller arranged upstream from a second control element, said second PID controller generating a second manipulated variable, a set point and the controlled variable being fed to the first and the second PID controllers, the first PID controller being in automatic mode as a primary PID controller and being provided with a manipulated variable limitation device having specified or specifiable limit values for the first manipulated variable, and the second PID controller being switchable between a second automatic mode and a tracking mode in which the second PID controller generates a specified or specifiable constant value of the second manipulated variable; and
    a logic circuit configured to switch the second PID controller into the second automatic mode if a limit value of the first manipulated variable is reached, and otherwise to switch the second PID controller into the tracking mode.

2. The control device as claimed in claim 1, wherein the specified or specifiable limit values for the first manipulated variable are changeable as a function of a respective process state or as a function of time.

3. The control device as claimed in claim 1, wherein the second manipulated variable is routed in the tracking mode to an input of the second PID controller for a specified value of the manipulated variables.

4. The control device as claimed in claim 2, wherein the second manipulated variable is routed in the tracking mode to an input of the second PID controller for a specified value of the manipulated variables.

5. The control device as claimed in claim 1, wherein the second PID controller is manually switchable by an operator in manual mode.

6. The control device as claimed in claim 1, wherein the second PID controller is provided with a manipulated variable limitation device having the specified or specifiable limit values for the second manipulated variable;
    wherein the first PID controller is switchable between the automatic mode and a second tracking mode in which the first PID controller generates a specified or specifiable constant limit value of the first manipulated variable; and
    wherein the logic circuit is further configured to switch the second PID controller into the second automatic mode, so that the second PID controller is operated as the primary PID controller, and configured to switch the first PID controller, which is then no longer operated as the primary PID controller, into the automatic mode, if a limit value of the second manipulated variable is reached, and otherwise to switch the first PID controller into the second tracking mode.

7. A method for controlling a process in which a controlled variable is influenceable by a plurality of different control elements which are based on different physical principles, and having a control device in which a first Proportional-Integral-Derivative (PID) controller is arranged upstream from a first control element, said first PID controller generating a first manipulated variable, and a second PID controller is arranged upstream from a second control element, said second PID controller generating a second manipulated variable, the method comprising:

feeding a set point and the controlled variable to the first and the second PID controllers, the first PID controller operating as a primary PID controller in an automatic mode and being provided with a manipulated variable limitation device having specified or specifiable limit values for the first manipulated variable, the second PID controller being switchable between a second automatic mode and a tracking mode in which the second PID controller generates a specified or specifiable constant value for the second manipulated variable; and switching, by a logic circuit, the second PID controller into the second automatic mode if a limit value of the first manipulated variable is reached, and otherwise switching, by the logic circuit, the second PID controller into the tracking mode.

8. A non-transitory computer-readable medium including a computer program stored thereon and executed by a computer that causes influence of a controlled variable by a plurality of different control elements which are based on different physical principles, the computer program comprising:

program code for feeding a set point and the controlled variable to first and second Proportional-Integral-Derivative (PID) controllers, the first PID controller operating as a primary PID controller in an automatic mode and being provided with a manipulated variable limitation device having specified or specifiable limit values for a first manipulated variable generated by the first PID controller, the second PID controller being switchable between a second automatic mode and a tracking mode in which the second PID controller generates a specified or specifiable constant value for a second manipulated variable generated by the second PID controller; and program code for switching, by a logic circuit, the second PID controller into the second automatic mode if a limit value of the first manipulated variable is reached, and otherwise switching, by the logic circuit, the second PID controller into the tracking mode.

9. The non-transitory computer program product of claim 8, wherein the non-transitory computer program product is a storage medium.

* * * * *